Sept. 9, 1952 — M. J. KOFOID — 2,609,942

FEEDING, POSITIONING, AND ORIENTING MECHANISM

Filed June 6, 1949 — 4 Sheets-Sheet 1

INVENTOR
MELVIN J. KOFOID
BY
J. R. McDougall
ATTORNEY

Sept. 9, 1952  M. J. KOFOID  2,609,942
FEEDING, POSITIONING, AND ORIENTING MECHANISM
Filed June 6, 1949  4 Sheets-Sheet 2
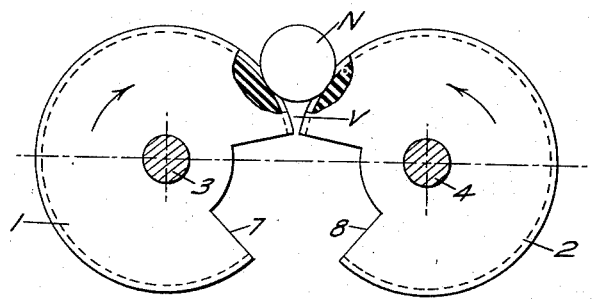
Fig.7-A.
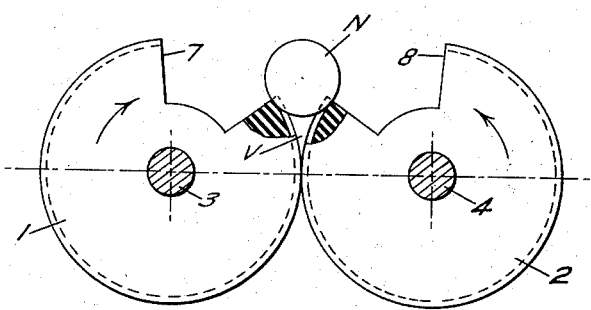
Fig.7-B.
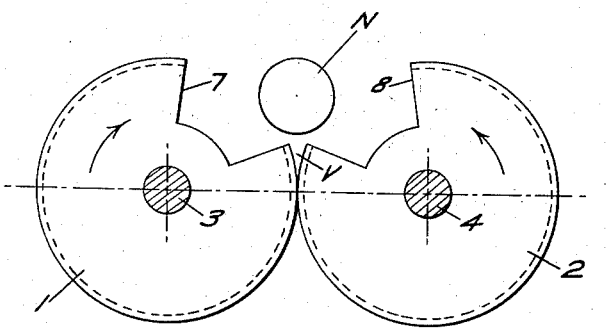
Fig.7-C.
INVENTOR
MELVIN J. KOFOID
BY
G.F.McDougall
ATTORNEY

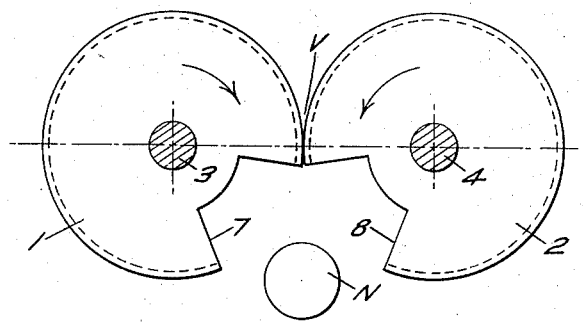
Fig. 7-E.
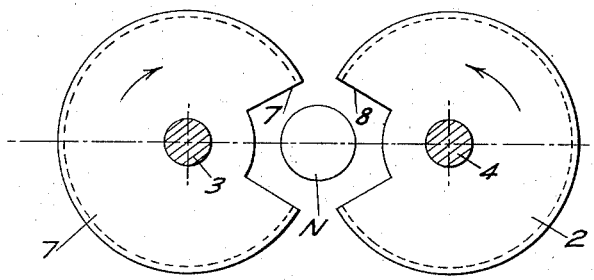
Fig. 7-D.
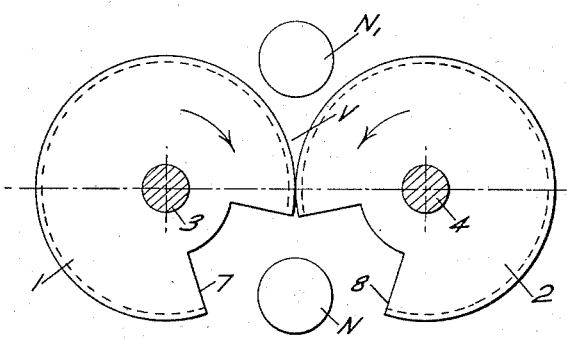
Fig. 7-F.

Sept. 9, 1952 M. J. KOFOID 2,609,942
FEEDING, POSITIONING, AND ORIENTING MECHANISM
Filed June 6, 1949 4 Sheets-Sheet 4
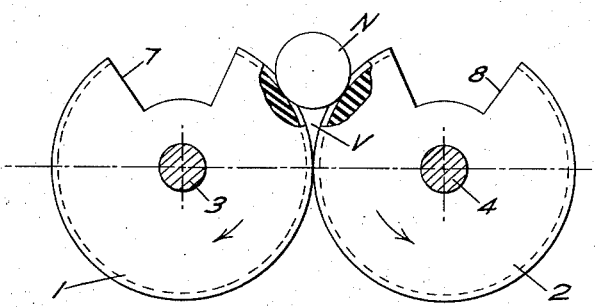
Fig.8·A.
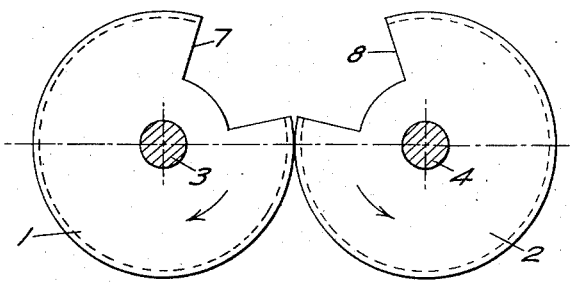
Fig.8·B.
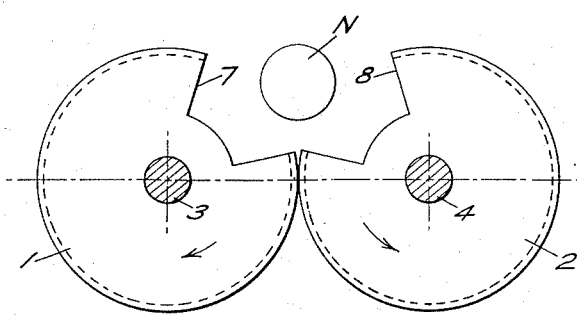
Fig.9.
INVENTOR
MELVIN J. KOFOID
BY
G.F. McDougall
ATTORNEY Patented Sept. 9, 1952

2,609,942

UNITED STATES PATENT OFFICE 2,609,942

FEEDING, POSITIONING, AND ORIENTING MECHANISM

Melvin J. Kofoid, Corvallis, Oreg., assignor to Northwest Nut Growers, Dundee, Oreg., a cooperative association of Oregon Application June 6, 1949, Serial No. 97,336

8 Claims. (Cl. 214—1)

1

This specification discloses and claims an orienting and positioning machine, suitable for orienting and positioning walnuts or the like for further succeeding processing, as described in and included with other devices in the co-pending joint application for a complete walnut cracker, Ser. No. 98,732, filed June 13, 1949, wherein the device of this application is disclosed in combination with other devices but not directly claimed except as one element in combination claims including other elements.

The shells of walnuts can be exploded away from the nut meats by passing a suitable electrical current through the interior of the nut, along the major axis of the nut, hereinafter defined. Walnuts without processing, as in nature, have a natural opening at the stem end, blocked to some extent by fibrous matter, and a much smaller hole at the opposite end; otherwise the shell is made of excellent dielectric material requiring high voltage to accomplish electric puncture.

It has also been determined that the path between the holes, whether as nature made them, or enlarged, is the only direction through which current can be sent and preserve a high percentage of unbroken meat halves.

It is the major object of this invention to provide a mechanical device that will rapidly and accurately orient a nut, at the same time positioning it so that proper electrodes may, by contact, penetration or otherwise, establish a high voltage current path through the nut between the natural ends of the nut, coinciding closely with a line through the holes. This is called the major axis of the nut for the purposes of this specification.

Solution of the object, supra, requires orientation of the nuts rapidly and accurately, accompanied by positioning them axially with their major axes coinciding with or very close to an axial line common to a pair of electrodes. Apparatus to perform this function is disclosed hereinafter.

I accomplish the objects stated by the mechanisms shown schematically and somewhat diagrammatically in the following drawings, in which.

Figs. 7A, 7B, 7C, 7D, 7E and 7F are diagrams illustrating the structure shown in Fig. 6 in six different positions to explain their functions in a mode of operation, explained hereinafter; and Figs. 8A, 8B and 9 show three positions of the orienting wheels which may be regarded as stages of progress when a nut is to be oriented and positioned, then engaged by electrodes while the notches revolve out of support position, preparatory to the nut being shattered as to the shell in a manner to be explained in detail and corresponding to that used in the co-pending application.

Figure 1:
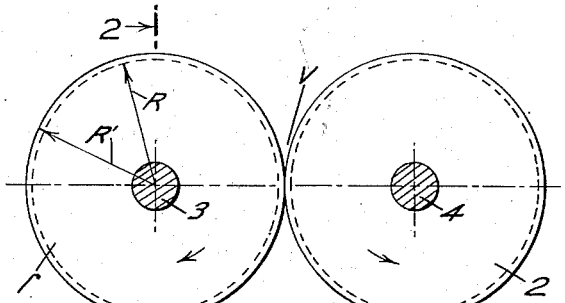
Fig. 1 is a view showing two orienting and positioning wheels in end elevation, mounted on the shafts 3 and 4.
Figure 3:
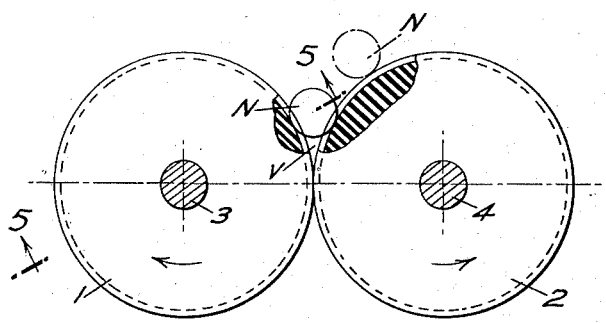
Fig. 3 is a repetition of Fig. 1, with parts broken away, diagrammatically showing a circle representing the nut to be oriented, and containing a dotted circle, which indicates the position of the nut N an instant previously.
Figure 6:
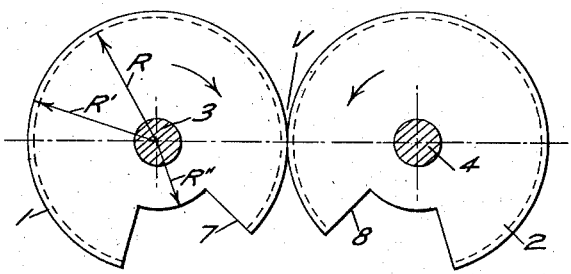
Fig. 6 is the same structure shown in Fig. 1, modified by two notches cut in the wheels, interrupting the grooved perimeters.

Explaining the drawings in greater detail:

Each of the wheels such as 1 and 2, when shown in plan, bear arrows indicating a preferred direction of rotation, clockwise as to wheel 1 and counterclockwise as to wheel 2, so that nuts on the top surface of either wheel tend to be drawn towards the V-shaped region V, as shown in Figs. 1, 3 and 6.

They will run in various ways other than shown, but indifferently well in some cases and hardly usable in other variations. It is also preferred to run them at the same perimeter speed and where the wheels with gaps are used, see Figs. 6 to 9 inclusive, close registration of the gaps being necessary, running at the same speed is a critical requirement.

Figure 2:
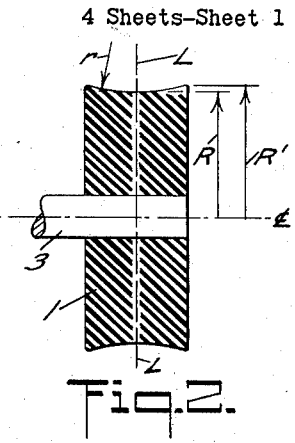
Fig. 2 is a section taken on the plane 2—2, Fig. 1.

Each of the wheels is provided with an inwardly concaved groove such as that indicated by the arrow and the letter $r$ in Fig. 2. This designation is to be taken as applied to all of the wheels from Fig. 1 to Fig. 9 inclusive, except that the groove is interrupted by the gaps 7 and 8 wherever these are shown and used; otherwise the wheels are the same.

The wheels as indicated will run closely together, as shown in all of the figures shown in plan, the wheels in apparent contact though the contact need not be actual. The axes of the wheels will be in the same horizontal plane and parallel. The plane of symmetry L, shown on those diagrams in section, 2, 4 and 5, should be the same for each wheel of a pair and any variation will impair the ability of the machine to do its best work.

In Fig. 2, the radial lines R and R' show the radius, respectively of the bottom of the groove (agreeing with the sections of Figs. 4 and 5), and the two edges of the groove.

It will be noted that the figures show two types of orienting wheels, one with notches 7 and 8, and the basic type, without notches, shown in Figs. 1 to 5 inclusive. The figures are arranged in three groups, to explain three different modes of operation in placing a nut in shell shattering position, with respect to a pair of aligned electrodes, such as 5 and 6 in Fig. 5, and presumed to be present in the other figures; but the first operation of orienting and positioning the nut is the same in all cases and has to be done before any relatively fast electric cracking can be possible.

The automatic mode of orientation and positioning, inherent in the grooved wheels 1 and 2, will be explained first and since it is identical with notched wheels, the explanation serves for the other groups, Figs. 6 to 7F inclusive and Figs. 8A to 9 inclusive.

The grooved wheels, by operation of their concavely grooved perimeters when rolling towards each other, the left hand wheel clockwise and the right hand wheel counterclockwise, will position and orient a nut placed haphazardly on either wheel at any point where the motion will tend to bring the nut into the V-shaped region V. Due to the force of gravity combined with the motion of the peripheral surface of the wheel it happens to strike, the nut will quickly arrive at the bottom of the V-shaped region V as shown at N in Fig. 3, in haphazard orientation and position. Then the following corrective orienting and axial positioning action will follow immediately.

Figure 4:
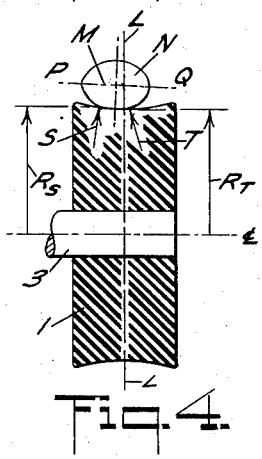
Fig. 4 is a section taken on the plane 5—5, Fig. 3, with an ellipsoid of revolution useful in explaining orientation of a nut by operation of the wheels.

Consider a nut as shown in Figs. 3 and 4, in contact with both wheels but out of position with respect to the plane of symmetry L of the grooves, the axis of the nut, P—Q, not parallel to the axis of the wheels 1 and 2, and the ends of the nut not equidistant from the plane of symmetry L.

In general there will be three points of contact between the nut and the two wheels. Assume that the nut has the two points of contact, S and T with the groove of the wheel shown in Fig. 4. The peripheral velocity of the wheel is greater at RS than it is at RT because radius RS is greater than radius RT; thus a greater force is exerted at point S than at point T, and the unbalanced force moves the nut deeper into the V-shaped region V, formed by the specially contoured peripheral surfaces of the wheels. The corrective action will continue rapidly until in final position the nut will be oriented as to its major axis (see Fig. 5), which will be automatically parallelized with the axes of the wheels in horizontal and vertical planes.

Further, the nut is centered with respect to the plane of symmetry L. Frictional contact of the nut with the periphery of the wheels and the forces of gravity, combine to orient and position the nut in a very short time interval and with sufficiently good alignment for the purpose.

Figure 5:
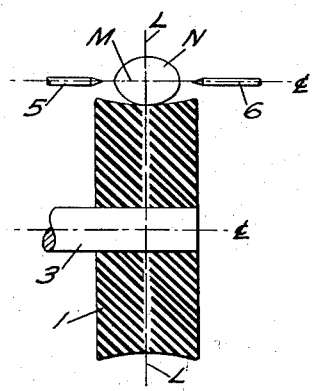
Fig. 5 is a section of Fig. 3, taken on the plane 5—5 of Fig. 3, with electrodes schematically shown.

If the wheels without notches (Figs. 1 to 5 inclusive) are used, then the nut must be exploded where it lies, and electrodes 5 and 6 are shown in Fig. 5, with the major axis of the nut N aligned with the axes of the electrodes 5 and 6, which may be moved into contact, penetration or otherwise, able to send a shell shattering current through the nut N. The fully oriented and positioned nut is indicated by the ellipsoid of revolution N in Fig. 5.

I will now describe one of the modes of operation, where the wheels 1 and 2 are provided with gaps 7 and 8. The direction of rotation remains the same and the wheels in Fig. 6 will be presumed to be running and awaiting the dropping of the first nut into the V-shaped region V, or any place on either wheel where gravity plus wheel rotation will bring it into that region.

The wheels 1 and 2 (Fig. 7A) made nearly a full revolution when a nut N found its way, in the way described supra, to the position shown in Fig. 7A, and has the greater part of another revolution of the wheels for complete correction of any displacements of axial alignment, plane of symmetry misplacement, or other error in any respect. The nut has finally reached the position quite near to the gap area in both wheels where support by them will be wholly lacking. The nut N is oriented and positioned and has zero velocity, due to gravity, though both wheels have a finite velocity.

In Fig. 7B, the gap areas have left the nut N in free fall attitude with respect to the wheels, but inertia did not permit instant follow-up by the nut, which will be assumed to have started in Fig. 7C.

In Fig. 7D, the nut is falling nearly at the speed of the oncoming surfaces of the gaps, indicated by numerals 7 and 8 in this figure; but in Fig. 3, the nut is below any possible contact with the wheel and at this point it is presumed to be contacted by electrodes aligned with its major axis for the purpose of electric cracking.

Fig. 7F shows the same situation as existed in Fig. 7A at the start of the cycle just described, an early drop of the nut. Nut N in Fig. 7F will explode just prior to the time that nut N' contacts the wheels, but the gaps 7 and 8 have positioned themselves to completely shield the oncoming new nut N', which is protected against shell fragments or other disturbance due to electric shell shattering that might otherwise disturb it.

Figs. 8A, 8B and 9 show three terminal positions of a pair of orienting wheels with gaps, such as are illustrated in the co-pending joint application. In Fig. 8A, the nut N is presumed to have been oriented, positioned and suitably engaged by electrodes of the movable sort so that it is held, independently of the orienting wheels 1 and 2; though as shown it still has the wheels under it. At an instant later the shell shattering current will be presumed to have been sent through the shell, leaving the gaps empty.

The current application can occur at any time after the nut is engaged by the electrodes, but preferably at the point shown in Fig. 9, because at that point the lower boundaries of the gaps have dropped near to the horizontal axis of the wheels and the upper boundaries are nearly vertical and in excellent position to act as shields to prevent undue scattering of shell fragments.

Of the three described ways in which a nut can be oriented, positioned and then electrically cracked, I am at present inclined to think that if there is any choice between them, it favors the last described or contact method where the nut is held in space when cracked.

Nuts vary in size and rugous outer surface. The ends of a nut whose cross section in any plane normal to its major axis is a circle, will position exactly equidistant from the plane of symmetry and the major axis will be exactly parallel to the axis of either wheel. As it is, it will be well to grade the nuts by well known apparatus and crack those of a given size in batches.

Having disclosed my invention so that those familiar with the art to which it appertains can make and use it, what I claim as new and desire to secure by Letters Patent, is:

1. An orienting device for nuts or the like articles of generally ovoid form having major and minor axes comprising a pair of similar wheels mounted for revolution at the same speed, their upper surfaces running together, in side by side relationship with their axes parallel, to define a V-shaped region between the wheels and above the plane of their axes, the perimeters of said wheels concavely grooved to receive a nut or the like when running and immediately orient the major axis of the said nut into parallel relationship with the axes of the wheels.

2. An orienting device as claimed in claim 1, modified by a portion of each wheel perimeter being removed to form a deep notch in each wheel, said wheels timed to register with each other and form an open gap by registration of said notches, once in each revolution of the wheels.

3. An orienting device of the character described, comprising a pair of mating, similar revoluble wheels, said wheels supported for revolution with a common plane of symmetry, said wheels grooved with a single concave groove of substantial depth in each perimeter entirely around said perimeters and mounted closely together to define a V-shaped orienting region above the axes and between the wheels, said wheels revoluble with their upper surfaces running towards each other at the same speed to orient a nut of generally ovoid shape with the longer axis thereof in substantial parallelism with the axes of the wheels.

4. An orienting device as claimed in claim 3, modified by a portion of each wheel being removed to form a like deep notch in each wheel, said notches of like size and said wheels timed to bring said notches in registry once in each revolution to remove all support from an oriented nut, to place the same in free fall condition, by eliminating the V-shaped region while the notches are in registry.

5. An orienting mechanism comprising a pair of like wheels mounted for revolution at the same speed with parallel horizontal axes, the upper wheel surfaces thereof rolling together, in the same horizontal and vertical planes with common axes of symmetry to define a V-shaped orienting region the axis of which is parallel to the axes of the wheels, said wheels concavely grooved as to a major part of their circumferential surface and provided with similar deep cut notches, said notches timed to register as the wheels revolve, to release an object maintained in oriented position after a part revolution of the said wheels.

6. An orienting mechanism for receiving, orienting and subsequently releasing a walnut, or the like, comprising a pair of revoluble similar wheels formed with concavely grooved perimeters, said wheels mounted to run towards each other with respect to their upper surfaces, said wheels of the same diameter, mounted in the same horizontal plane and having a common vertical plane of symmetry, said wheels deeply notched and timed to interrupt each circumference for the same part of each revolution, to release a held nut from all support by both wheels.

7. A device for giving the major axis of a walnut a predetermined orientation, concurrently with positioning the major axis of the nut, comprising a pair of identical wheels mounted for revolution in the same horizontal plane and having a common axis of symmetry, said wheels defining a V-shaped region above the plane of their axes and between the wheels, said wheels concavely grooved as to the major part of their circumferences and provided with equal deep gaps as to the remainder of said circumferences, said gaps timed to register with each revolution of the wheels to position a nut vertically and horizontally orient its major axis into parallelism with the horizontal axes of said wheels and subsequently release the held nut from support by said wheels by registration of said gaps.

8. An automatic orienting device for orienting a timed sequence of generally ovate nuts preparatory to exploding the same by electric surge, comprising a pair of concavely grooved disc type wheels of substantial thickness, mounted to run their top perimeter together to define a V-shaped orienting region between said wheels, said wheel concavely grooved in the same plane of symmetry and each of said discs provided with duplicate gaps, said gaps arranged to register once each revolution, to withdraw all support from an oriented nut preparatory to exploding the same.

MELVIN J. KOFOID.

REFERENCES CITED

The following references are of record in the file of this patent:

UNITED STATES PATENTS

| Number | Name | Date |
|---|---|---|
| 856,482 | Lovell | June 11, 1907 |
| 1,187,878 | Williams | June 20, 1916 |
| 1,461,410 | Aldrich | July 10, 1923 |
| 1,851,820 | Dunbar | Mar. 29, 1932 |
| 1,880,243 | Dreher | Oct. 4, 1932 |
| 1,902,244 | King | Mar. 21, 1933 |
| 1,927,847 | Resser | Sept. 26, 1933 |
| 1,965,460 | Gebhardt | July 3, 1934 |
| 2,051,695 | Glacy | Aug. 18, 1936 |
| 2,248,327 | Bainer et al. | July 8, 1941 |
| 2,265,588 | Walker | Dec. 9, 1941 |
| 2,296,645 | Marsden | Sept. 22, 1942 |
| 2,504,374 | Baldwin | Apr. 18, 1950 |
| 2,512,411 | Blankenship et al. | June 20, 1950 |